Nov. 5, 1968     C. V. EICHOLTZ ET AL     3,409,207

DISPOSABLE CUPS AND HANDLES

Filed May 2, 1967     2 Sheets-Sheet 1

INVENTORS.
Clara Virginia Eicholtz
Edgar F. Trombly
Bertrand N. Trombley
BY
ATTORNEY Nov. 5, 1968   C. V. EICHOLTZ ET AL   3,409,207
DISPOSABLE CUPS AND HANDLES
Filed May 2, 1967   2 Sheets-Sheet 2

INVENTORS.
Clara Virginia Eicholtz
Edgar F. Trombly
Bertrand N. Trombley
BY
Lloyd E. Hessinger
ATTORNEY United States Patent Office 3,409,207
Patented Nov. 5, 1968

3,409,207
DISPOSABLE CUPS AND HANDLES
Clara Virginia Eicholtz, Midland, Edgar F. Trombley, Grosse Pointe Farms, and Bertrand N. Trombley, Bloomfield Hills, Mich., assignors to The Dow Chemical Company, Midland, Mich., a corporation of Delaware
Filed May 2, 1967, Ser. 635,449
3 Claims. (Cl. 229—52)

ABSTRACT OF THE DISCLOSURE

The invention concerns a plastic throw-away cup having a peripheral groove about its upper portion, which groove securely receives a split ring of a separate wire handle. The contour of the finger gripping portion of the handle is such that adequate support for the cup can be had by holding the handle alone even when the cup is filled with a heavy liquid. It is the intent that the handle as well as the cup be thrown away after a single use.

---

Prior to the present invention, disposable cups were without handles and had to be gripped about their body portion, which often presented among other problems, that of heat transfer from the contents through the cup walls, or had to be placed in a handle of a permanent non-throw away type such as shown in U.S. Patent 2,070,414 or U.S. Design Patent 204,474, for example. Other common ways of supporting disposable cups have usually comprised paper containers having pull-out paper handles which, as is well known, only gives a flimsy support to the cup. Other concepts involving a detachable type handle for disposable containers, such as taught in U.S. Patent 2,070,367, have not been of such a construction nor combined with a satisfactory container so as to provide a stable relationship between the cup and handle when in use.

Accordingly, it is an object of the present invention to provide a unique combination of container and wire handle wherein both are disposable and when combined together provide an especially secure relationship heretofore unknown in disposable handled containers.

A more specific object of the present invention is to combine a throw-away wire handle with a disposable container wherein the handle has a ring portion securely mating with a grooved portion of an outwardly tapered side walled cup wherein both the design of the handle and the fitting between the ring, the groove and the side wall of the cup is such that an especially effective throw-away handled cup is obtained.

Yet additional objects and advantages of the present invention are even more apparent when taken in conjunction with the accompanying drawing in which like characters of reference designate corresponding material and parts throughout the several views thereof, in which.

Figure 2:
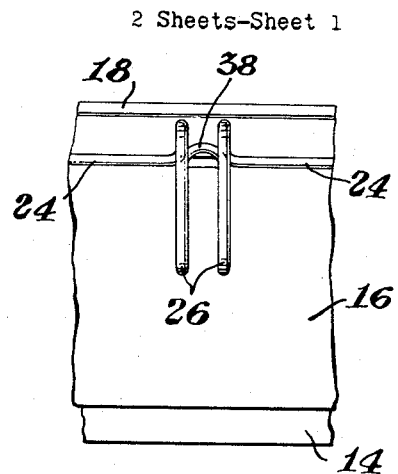
FIGURE 2 is a fragmentary rear elevational view thereof looking at the left end of FIGURE 1.
Figure 3:
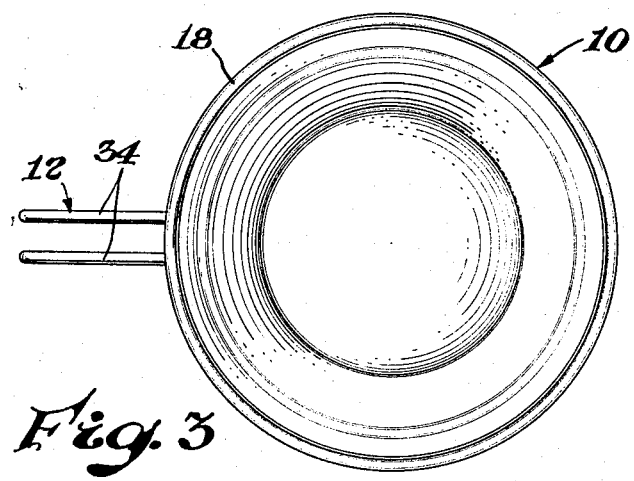
FIGURE 3 is a top view thereof.

The cups of the present invention are preferably formed of thermoplastic material such as polystyrene, polyethylene, polypropylene, polystyrene foam, polyethylene foam, or laminates of plastic films and foams, etc., and can be fabricated by such typical methods as injection molding, vacuum and/or plug assist pressure forming, or by normal foam sheet forming. The handles for these cups are preferably of wire formed of substantially resilient material such as steel or certain well known metal alloys, the gauge or size of the wire being dependent upon the size and weight of the container to which the handle is to be applied.

In FIGURES 1 to 4, there is shown a cup 10 with handle 12, both of which are of the type intended to be disposed of after a single use. The cup has a recessed bottom wall 14 and an outwardly veering side wall 16 ending in a peripheral rolled or beaded rim 18. If it is desired to stack such cups in a nested relationship, which might be expected, a stack shoulder 20 can optionally be included along the side wall 16, preferably at its lower extent, the peripheral edge 21 of bottom wall 14 of an upper nested cup 16 resting on the inside of shoulder 20 of the next lower cup 10.

Included adjacent the upper portion of the side wall 16 is a peripheral generally horizontally disposed groove 22 which receives at least half of the body of the cross section of the wire forming the handle 12. In this case, the cross section of the wire is circular so that the groove 22 is convexly semi-circular to receive it. The ring part 24 of the handle 12 which is engaged in the groove 22 substantially surrounds the periphery of the side wall 16 until it reaches the finger gripping portion 26 of the handle 12. In effect then, the ring 24 is a split ring which is resiliently biased together to snugly fit within the groove 22.

The ring 24 is joined with the finger gripping portion 26 at the juncture 28. The finger gripping portion 26 has an inclined shoulder 30 which extends upwardly at an angle substantially the same as that of an adjacent veering portion 32 of the side wall 16 of the cup so that it can rest along the greater part of its extent against the veering portion 32. The shoulder 30 and veering portion 32 support one another against a hinging action at juncture 28, especially when the cup is filled with liquid and thus act as mutual support portions. The length of the shoulder 30 should be sufficient to support the cup when filled, preferably being at least a length of one-tenth that of the vertical dimension of the side wall 16, when the cup is of normal dimension, i.e., the cup width (diameter) is less than its height. This also permits the top or generally horizontal leg 34 of the finger gripping portion 26 to be moved upwardly with respect to the top rim 18 to give a better resistance to bending or tipping of the cup with respect to the handle 12. From the top leg 34, the handle preferably has a finger groove formed by a lower semi-oval curved leg 36 of the finger gripping portion 26, the two like curved legs 36 being joined by a bridge portion 38.

Figure 1:
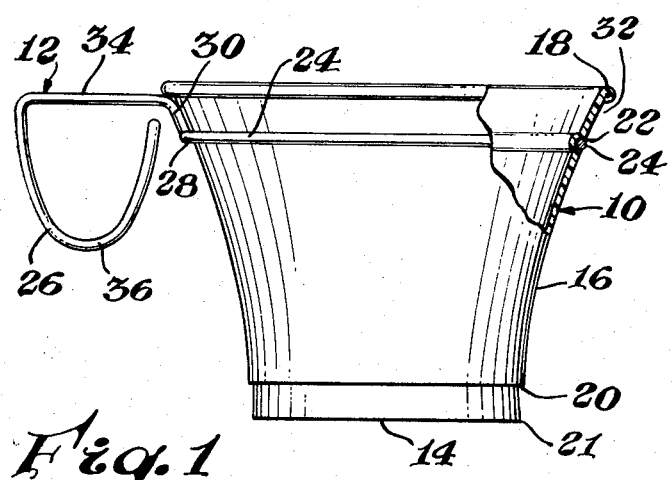
FIGURE 1 is a side elevational view of a disposable cup and handle constructed according to the principles hereof, with a fragmentary portion thereof broken away.
Figure 5:
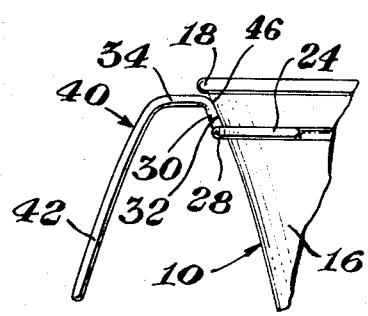
FIGURE 5 is a fragmentary side elevational view of a modified form of a disposable cup and handle constructed according to the principles hereof.
Figure 6:
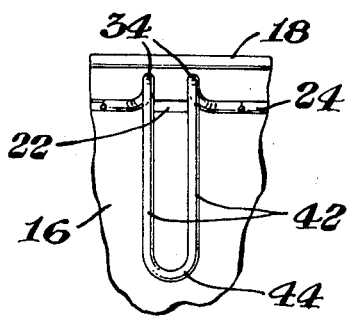
FIGURE 6 is a fragmentary rear elevational view thereof.
Figure 4:
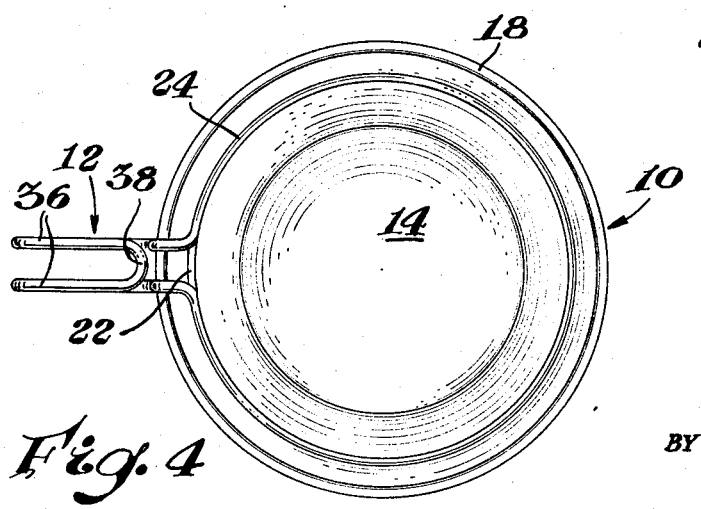
FIGURE 4 is a bottom view thereof.
Figure 7:
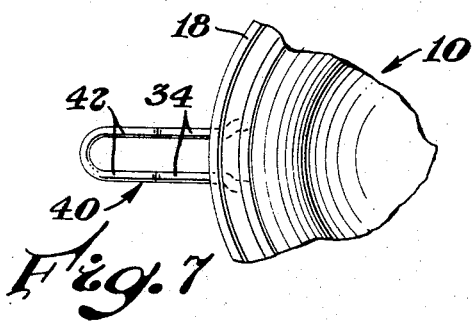
FIGURE 7 is a top view thereof.

In the embodiment shown in FIGURES 5 to 7 the cup 10 is the same as that shown in the embodiment illustrated in FIGURE 1. However, the handle 40 is different in that it has finger gripping portions 42 which are outwardly and downwardly veering, the two portions 42 being joined at their bottom by U-shaped bridge 44 to give a handle which is especially comfortable when gripped by users with particularly large or thick fingers. The outwardly and downwardly veering slope of the portions 42 are such as to counterbalance the hinging action at the upper edge 46 of the shoulder 30, thereby greatly increasing the stability between the handle 40 and the cup 10.

Figure 10:
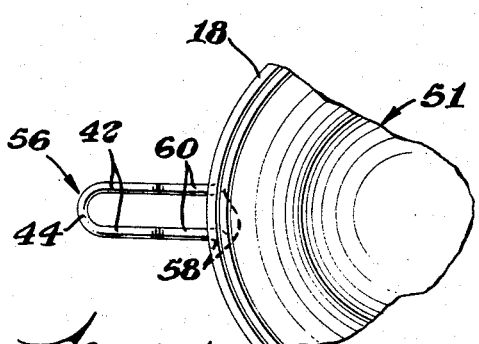
FIGURE 10 is a top view thereof.
Figure 8:
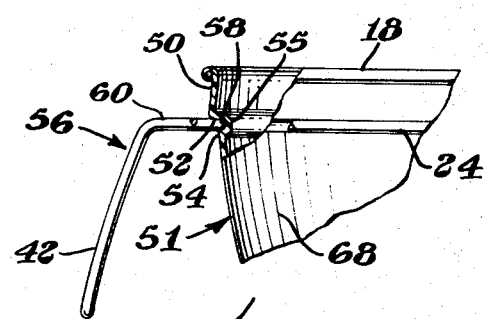
FIGURE 8 is a fragmentary side elevational view of yet another modified form of a disposable cup and handle constructed to the principles hereof.
Figure 9:
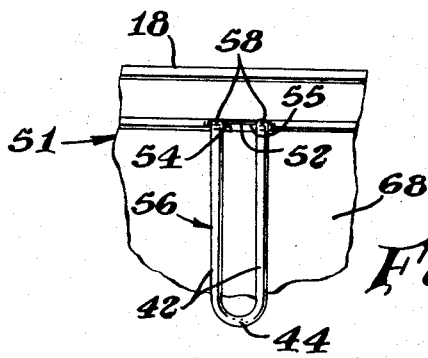
FIGURE 9 is a fragmentary rear elevational view thereof.

Yet further embodiments of the present invention are found in FIGURES 8 to 10 and 11 to 13. In FIGURES 8 to 10 a stacking ring 50 in a cup 51 is located along the side wall 68 immediately adjacent and above the groove 55, the groove receiving a handle 56.

The bottom edge 52 of stacking ring 50 protrudes outwardly from normal contour of side wall 68 and, thus, considerably outwardly from the bottom edge 54 of groove 55. The ring 24 of handle 56 preferably fits within groove 55 such that its outermost extent does not protrude beyond edge 52. Extending generally horizontally from ring 24 at juncture 58 are generally horizontal connecting portions 60 from which downwardly and outwardly veering legs 42 extend. Connecting both legs 42 is a U-shaped bridge 44. The deep channel of groove 55 serves to securely lock ring 24 in position and counterbalances the hinging action between the cup and handle which occurs adjacent juncture 58 whereby the ring 24 and edge 52 serve as mutual support portions. In addition the edge 54 of an upper cup 51 of two nested cups 51 forms a stack function by resting on a rim 18 of the next lower cup 51, this stacking not being shown. In other respects, handle 56 is similar to handle 40 earlier described.

Figure 13:
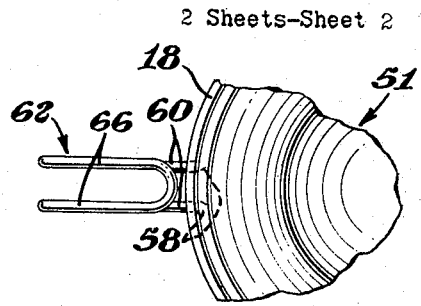
FIGURE 13 is a top view thereof.
Figure 11:
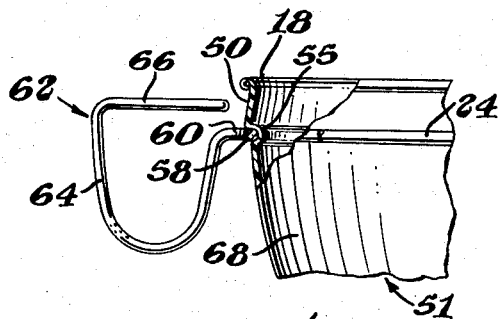
FIGURE 11 is a fragmentary side elevational view of still another modified form of a disposable cup and handle constructed according to the principles hereof.
Figure 12:
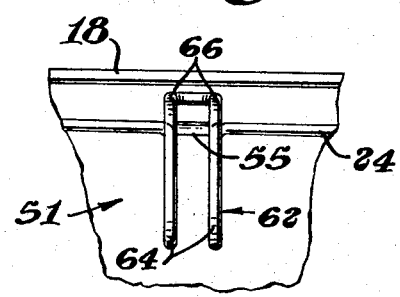
FIGURE 12 is a fragmentary rear elevational view thereof.

In the embodiment of FIGURES 11 to 13, a handle 62 has a ring 24 and generally horizontal connecting portion 60, as previously described. However, the finger gripping portion 64 is in a U-shape which on its outer leg extends upwardly beyond the level of the connecting portion 60 to a height just below rim 18, and then has a generally inwardly directed leg portion 66 extending almost to the stacking ring 50 of cup 51. The counterbalancing effect adjacent juncture 58 is as previously described.

In all of the embodiments the joint cooperation between the wire handle and the recessed groove of the cup is such that the leverage between the two is sufficient to support the cup by holding the handle alone even when the cup is filled with a heavy liquid. It is the intention that the cups be sold in a stacked relationship in a carton and that included in that carton or in a separate package would be a plurality of handles. The handles and cups would be purchased together and be assembled by the ultimate consumer just prior to use and be thrown away or otherwise disposed of at the end of a single use.

While certain representative embodiments and details have been shown for the purpose of illustrating the invention, it will be apparent to those skilled in the art that various changes and modifications can be made therein without departing from the spirit and scope of the invention.

Accordingly, what is claimed as new is:

1. A thermoplastic cup and a wire-like handle combination adapted to be disposed of after a single use comprising a cup having a bottom wall, an upwardly and outwardly veering side wall ending in a peripheral rim, a peripheral groove disposed generally horizontally about an upper portion of said side wall adjacent said rim, said handle having a split ring snapped into said groove, and finger gripping portions extending outwardly from said ring at its juncture therewith, said handle and said cup having mutual support portions adjacent said juncture substantially preventing a hinging action between said finger gripping portions and said ring when said cup is held by its handle.

2. The combination of claim 1 wherein said mutual support portions include upwardly inclined connecting portions between said ring and said finger gripping portions, said inclined portions resting against said side wall substantially along their lengths by having an angular inclination generally the same as that of their adjacent side wall.

3. The combination of claim 1 wherein said mutual support portions include an upper edge of said groove which extends substantially outwardly beyond the lower edge of said groove and more than half the width of the ring cross section whereby said ring is supported against said upper edge.

References Cited

UNITED STATES PATENTS

| | | | |
|---|---|---|---|
| 2,070,367 | 2/1937 | Mackilbank | 294—33 |
| 2,630,244 | 3/1950 | Brock | 220—94 |
| 2,991,907 | 7/1961 | Kinnison | 220—85 |
| 3,335,901 | 8/1967 | Edwards | 220—60 |

DAVID M. BOCKENEK, *Primary Examiner.*

Washington, D.C. 20231

UNITED STATES PATENT OFFICE
CERTIFICATE OF CORRECTION

Patent No. 3,409,207 November 5, 1968

Clara Virginia Eicholtz et al.

It is certified that error appears in the above identified patent and that said Letters Patent are hereby corrected as shown below:

In the heading to the printed specification, line 3, "Edgar F. Trombley" should read -- Edgar F. Trombly --.

Signed and sealed this 17th day of March 1970.

(SEAL)
Attest:

Edward M. Fletcher, Jr.　　　　　　　　　　WILLIAM E. SCHUYLER, JR.
Attesting Officer　　　　　　　　　　　　　　　Commissioner of Patents